UNITED STATES PATENT OFFICE.

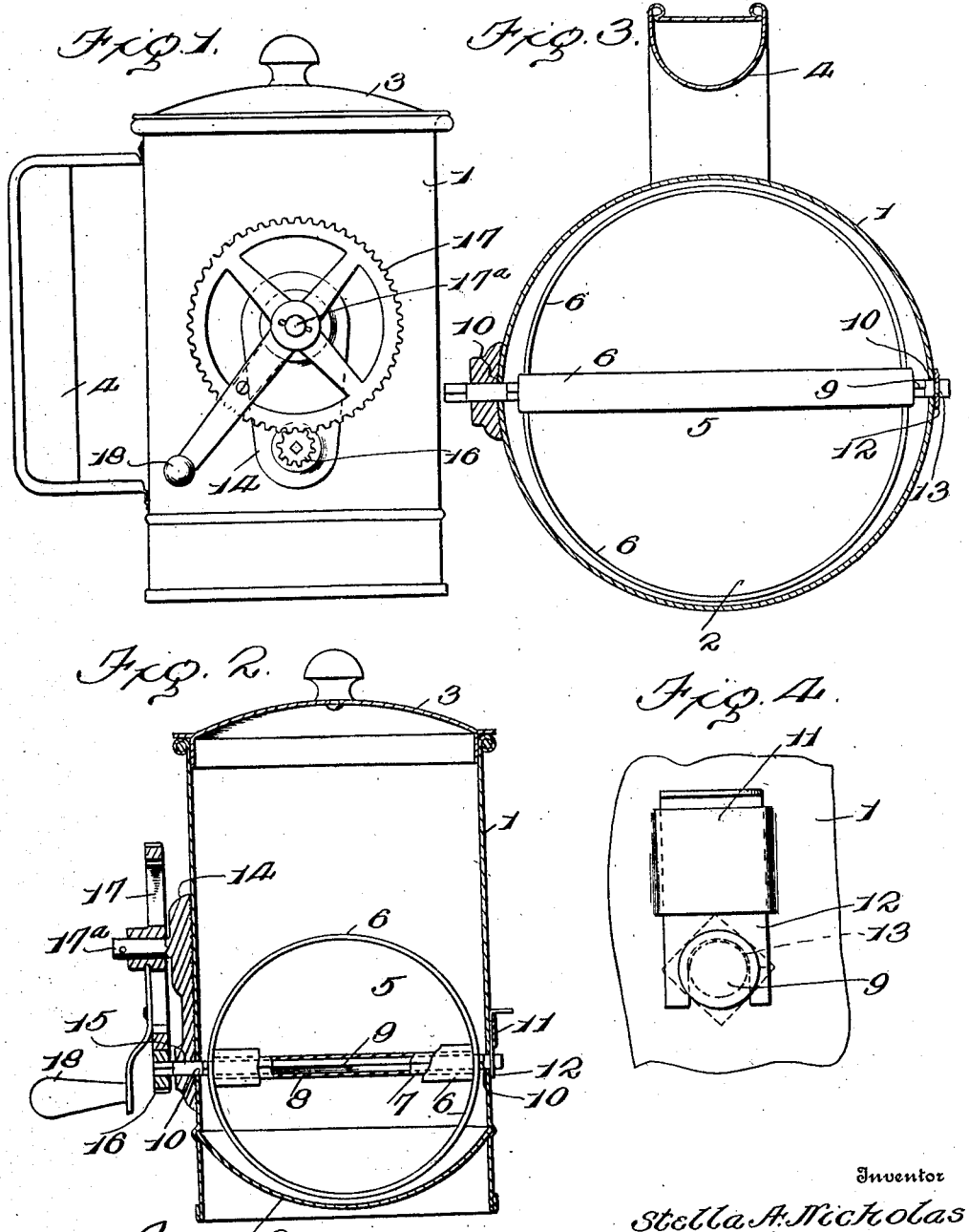

STELLA A. NICHOLAS, OF CLYDE, KANSAS.

EGG-BEATER.

No. 919,625.  Specification of Letters Patent.  Patented April 27, 1909.

Application filed August 19, 1908. Serial No. 449,290.

*To all whom it may concern:*

Be it known that I, STELLA A. NICHOLAS, citizen of the United States, residing at Clyde, in the county of Cloud and State of Kansas, have invented certain new and useful Improvements in Egg-Beaters, of which the following is a specification.

This invention comprehends certain new and useful improvements in kitchen utensils, and the object of the invention is an improved egg beater by means of which the eggs or other desired substances may be thoroughly beaten with a minimum expenditure of time and labor, which is susceptible of being quickly and conveniently separated into its various parts to permit the same to be cleaned with unusual facility, and which possesses certain other advantages that will become at once apparent as the invention is hereinafter disclosed, over the devices which have heretofore been employed for this purpose.

With this and other objects in view as will more fully appear as the description proceeds, the invention consists in certain constructions, combinations and arrangements of the parts that will be hereinafter described and claimed.

For a full understanding of the invention, reference is to be had to the following description and accompanying drawings, in which:

Figure 1 is a side elevation of an egg beater constructed in accordance with my invention. Fig. 2 is a vertical section thereof. Fig. 3 is a horizontal section. Fig. 4 is a detail view illustrating the means for detachably securing the shaft in the casing.

Corresponding and like parts are referred to in the following description and indicated in all the views of the drawings by the same reference characters.

My improved egg beater embodies a body portion or casing 1 in which the eggs or other substances to be beaten are contained and which may be of any desired or approved construction or design. In the present instance this casing is substantially cylindrical and is provided at one end with a concave bottom 2 and is adapted to have its other end closed by a removable cover 3 as a precautionary measure to prevent the possible spilling of the contents during the beating operation, said body portion being preferably provided with a handle 4 so as to be rendered capable of being conveniently moved from place to place.

In order to effect a thorough agitation of the eggs, I provide an agitator 5 which is mounted within the casing and which embodies a plurality of substantially semicircular loops 6 of suitable stout wire or the like that are rigidly secured at their ends to the opposite ends of a hub 7 and extend radially therefrom as shown. This hub is formed with a longitudinal preferably square opening 8 in which is received a correspondingly formed intermediate portion of a shaft 9 that is disposed transversely of the casing above the concave bottom 2, the ends of this shaft being preferably round and being journaled in and projecting beyond corresponding apertures 10 formed in the body portion at diametrically opposite points. A plate or any other suitable piece of metal is secured to the casing above and in vertical alinement with one of these apertures and constitutes a guide-way 11 in which a slide 12 is mounted, the lower end of the slide being arranged to be received in an annular groove 13 formed in the periphery of the adjacent end of the shaft in order to detachably secure the same in the casing.

The casting 14 is secured to the opposite side of the body portion 1 and is formed near its lower end with an opening 15 which registers with the other aperture 10 and through which the corresponding extremity of the shaft projects. This last named end of the shaft carries a pinion 16 which is arranged for a meshing engagement with a relatively large gear wheel 17 that is rotatably supported upon an outstanding post 17$^a$ formed near the upper end of the casting and which is adapted to be conveniently rotated by means of a crank handle 18.

In the practical use of my improved egg beater it will be seen that as the crank handle is turned manually by the user of the device, the parts will be actuated so as to cause the agitator to rotate within the body portion and the loops 6 to sweep past the concave bottom 2 and in close proximity thereto, to manifestly effect a thorough agitation of the eggs or other substance contained within the casing. It is to be observed, however, that as the gear wheel 17 is relatively larger than the pinion 16, the agitator will revolve several times for each revolution of the handle, thereby effecting a material economy in the time and labor required for the beating operation.

By disengaging the slide 12 from the adjacent end of the shaft, it will be apparent that the latter may be disengaged from the corresponding aperture 10 and readily withdrawn through the hollow hub 7 and the registering apertures 10 and 15, so as to render the agitator capable of being removed from the casing to free the latter from any obstruction and permit the same and the various parts to be conveniently cleaned.

From the above description in connection with the accompanying drawing, it will be evident that I have provided an improved egg beating device which is efficient in operation, which is simple and durable in construction and which consists of comparatively few parts which may be easily and cheaply manufactured and readily assembled.

Having thus described the invention, what is claimed as new is:

A kitchen utensil of the character described, comprising a casing formed with a concave bottom and above said bottom with apertures extending therethrough at diametrically opposite points, an agitator mounted within the casing above the bottom and consisting of a hub formed with a longitudinal opening polygonal in cross section, and a plurality of loops secured at their ends to the opposite ends of the hub and extending radially therefrom, a transverse shaft formed with an intermediate portion of uniform polygonal cross section and fitting in the opening in the hub, the ends of the shaft being round and being journaled in the respective apertures and projecting beyond the casing, a plate secured to the casing above and in vertical alinement with one of the apertures and constituting a guide-way, the adjacent end of the shaft being formed in its periphery with an annular groove, a slide mounted in the guide-way and normally engaging with the groove to retain said end of the shaft in position in the casing, a casting secured to the opposite side of the casing and formed with an opening extending therethrough in registry with the adjacent aperture and through which the corresponding end of the shaft projects, a pinion secured to said last named end of the shaft, the casting being also formed with an outstanding post, and a relatively large gear wheel rotatably mounted upon the post and meshing with the pinion and provided with a crank handle, as and for the purpose specified.

In testimony whereof I affix my signature in presence of two witnesses.

STELLA A. NICHOLAS. [L. S.]

Witnesses:
G. G. GOODWIN,
BERT AUTEN.